United States Patent

[11] 3,589,815

[72] Inventor Harry L. Hosterman
 Akron, Ohio
[21] Appl. No. 739,128
[22] Filed June 21, 1968
[45] Patented June 29, 1971
[73] Assignee Information Development Corporation
 Akron, Ohio

[54] NONCONTACT MEASURING PROBE
 10 Claims, 5 Drawing Figs.
[52] U.S. Cl. ................................................. 356/167,
 350/6, 356/120, 356/4
[51] Int. Cl. ........................................................ G01b 11/30,
 G01c 3/08
[50] Field of Search............................................ 356/1, 4, 5,
 28, 161, 167, 120, 152, 156, 172, 169; 350/6

[56] References Cited
 UNITED STATES PATENTS
2,429,066 10/1947 Kuehni........................ 356/161
2,506,946 5/1950 Walker........................ 356/1
2,607,270 8/1952 Briggs......................... 356/156
2,665,607 1/1954 Blakeslee et al. ............ 356/1
3,016,464 1/1962 Bailey......................... 221/9
3,137,756 6/1964 Gunther et al. ............... 356/157
3,180,205 4/1965 Heppe et al. ................. 356/1
3,218,911 11/1965 Bower et al. ................. 356/169
3,330,964 7/1967 Hobrough et al. ............ 250/237
3,396,626 8/1968 Hughes........................ 356/16

FOREIGN PATENTS
1,213,598 1959 France ............................. 356/167

Primary Examiner—Ronald L. Wibert
Assistant Examiner—J. Rothenberg
Attorney—Oldham & Oldham ABSTRACT: A noncontacting optical probe capable of giving a continuous reading of the distance from a given reference to a contoured surface. A collimated beam is directed parallel to the optical axis of a fixed objective lens whose optical axis defines a measuring axis. The beam is deviated at a slight angle towards the surface to be measured, with the angle defining a projection axis. A lens assembly focuses the collimated beam to a very small diameter image point in front of the objective lens on the measuring axis. Translation of the lens assembly causes the image point to move along the measuring axis a distance equal to the movement of the assembly. The spot is not defocused along the axis. The light reflected from the surface is collected by the objective lens, directed through a filter and focused towards a prism lying in the focal plane of the lens. The prism is a 90° prism with the faces forming the 90° angle brought to a sharp edge at the focal plane of the lens. The amount of light reflected from the respective surfaces of the 90° angle are detected by photocells. The movement of the lens assembly is measured, and compared with the point at which the amount of light detected by the two photocells is equal and above a predetermined value. The distance from the lens assembly to the surface is measured at this instant. Linear reading can be presented in digital form with a resolution of 0.0001 inch, and to an accuracy of 0.0001 if desired.

NONCONTACT MEASURING PROBE

Heretofore, it has been known that in order to reproduce a contoured surface by mechanical means, it is necessary to know the exact dimensions and configurations of the surface. To this end, mechanical probes have been utilized for some time to take measurement readings to prepare blueprints or other information presentation facilities with sufficient information to enable reproduction of the surface by manual or other automatic means. However, in many instances, it is undesirable to utilize a contact probe to make such measurements as the probe tends to damage the surface being measured, and further because extremely accurate measurements with such probe are not possible.

Therefore, it is the general object of the present invention to avoid the deficiencies of the prior art by providing a noncontacting probe which is preferably optical in operation and which is relatively simple in construction, and extremely efficient in operation.

A further object of the invention is to provide a noncontacting optical probe capable of giving a continuous reading of the distance from a given reference to a contoured surface in digital form with a resolution of 0.0001 inch to an accuracy of 0.0001 inch with a reading frequency as high as 50 times per second.

The aforesaid objects of the invention and other objects which will become apparent as the description proceeds are achieved by providing in a noncontacting probe to measure surfaces the combination of means to produce a directed beam of radiating waves having an axis, first lens means to focus the beam to a point onto a surface to be measured, means defining a line in space away from the surface, second lens means to focus the waves reflected from the surface to a point on the line when the beam is in focus on the surface, means to continuously move the focused point in focus on the axis of the second lens so the point passes through the surface, means to detect when an equal amount of radiated waves of predetermined magnitude passing through the second lens means fall on each side of the line in space and produce a signal on this condition, and means to record the distance of the first lens means with respect to the surface upon receipt of the signal from the means to detect.

For a better understanding of the invention, reference should be had to the accompanying drawings wherein.

Figure 1:
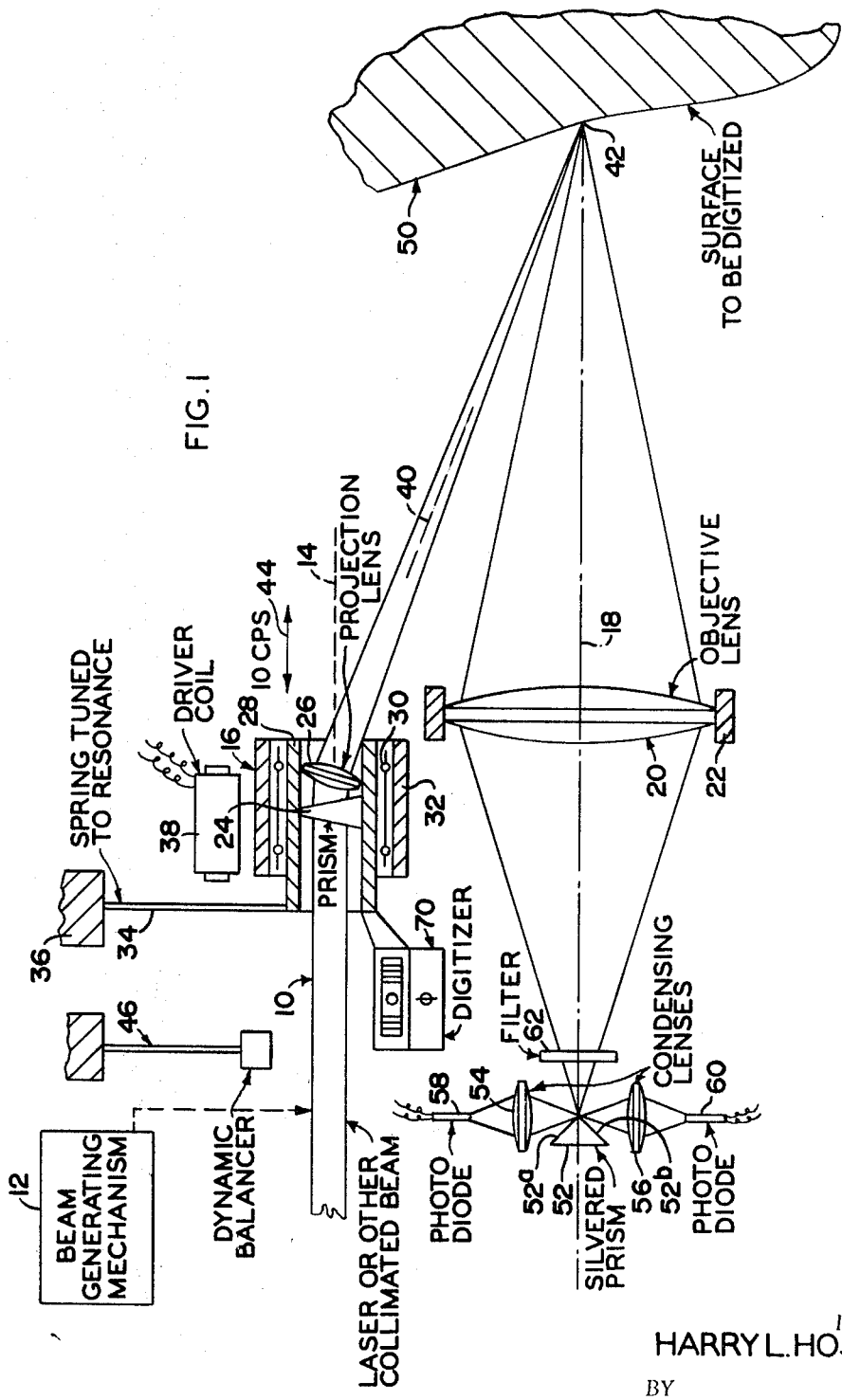
FIG. 1 is a schematic illustration of the preferred embodiment of the invention showing the relationship of the components to each other.

With reference to the embodiment of the invention illustrated in FIG. 1 of the drawings, the numeral 10 indicates generally a laser beam or other collimated radiating waveform in beam configuration which is generated by known means from suitable mechanism indicated by block 12. The beam 10 is directed parallel to the optical axis indicated by dotted line 14 of a lens assembly indicated generally by numeral 16. The beam 10 is also parallel to the optical axis 18 of an objective lens 20 which is mounted in a frame 22 in spaced relationship from assembly 16. The assembly 16 comprises a prism 24 and a projection lens 26 carried within a housing 28. The housing 28 is axially slidable in alignment on its axis 14 by means of appropriate ball bearings 30 holding housing 28 within an outer housing 32. Linear translation of housing 28 with respect to housing 32 is accomplished by a spring 34 connected at one end to housing 28 and at the other end to frame 36. A spring-mass system 15 formed by 34 and 28 that can be driven at resonance by a driver coil 38, all in a manner well known in the art to cause uniform reciprocal linear motion of housing 28.

The prism 24 bends the beam 10 at an angle of approximately 10° from axis 14 towards the objective lens optical axis 18 which is also called the measuring axis. This axis which is indicated by dotted line 40 is called the projection axis. The projection lens 26 focuses the beam 10 to approximately a 0.001-inch diameter image point at 42 which is positioned on the measuring axis 18 from between 1 inch to 20 inches in front of the objective lens 20, depending upon original design requirements. Also, it should be understood that the deviation of the projection axis 40 from the assembly axis 14 could be anywhere from about 5° to about 25°, and that the focus point might be anywhere from between about 0.005 inch to about 0.015 inch in diameter.

The translation or reciprocation of the prism lens assembly in housing 28 causes the image point 42 to move along the measuring axis 18 a distance equal to the movement of housing 28. This movement can be anywhere between 0.050 inch to about 0.400 inch in the direction indicated by a double-ended arrow 44. No defocusing of the point 42 occurs while it is scanning a length along the axis 18, so the amplitude of scan can be as large as it is mechanically feasible to move the housing 28. The spring-mass system can provide large amplitudes with very low power requirements in the driver coil 38. In order to eliminate vibration within the system, a dynamic balancer assembly indicated generally by numeral 46 can be provided, as selectively desired.

If a surface indicated generally by numeral 50, and shown in cross section, is positioned across the measuring axis 18 within the point image scan distance, a line will be formed by the point traversing the surface. The length of this line will be a function of the design, involving the excursion amplitude of the projection lens 26 and the angular offset caused by prism 24. Regardless of these parameters, the line will always be in sharp focus as the image point 42 crosses the intersection of the measuring axis 18 and the surface 50. At all other positions, the point will be slightly defocused with respect to surface 50, but since it is only used for precision measurement as it crosses the axis, this does not affect the accuracy of the probe.

The objective lens 20, which is fixed to the main frame 22, and to which housing 32 is fixed, also, images the point 42 moving on the surface being measured onto a prism 52 lying in the focal plane of the objective lens 20. The prism 52 is a 90° or right angular prism, with the faces 52a and 52b forming the 90° angle brought to an extremely sharp edge. These faces 52a and 52b are reflectively coated, thereby forming a precision beam splitter when the image of the point 42 falls on the sharp edge. The prism 52 is positioned with the 90° edge facing the objective lens and lying exactly on the measuring axis 18. The edge is normal to the plane of projection and measuring axes 40 and 18, respectively. Its longitudinal position is adjusted so that the image formed by the objective lens 20 falls on the 90° edge when the housing 28 is in the midpoint of its excursion of reciprocating motion. Condensing lenses 54 and 56 on both sides of the prism 52 focus the reflected light onto a pair of photodiodes 58 and 60 positioned at 45° relation to the faces 52a and 52b as shown. If a laser or green line of mercury is used as the beam source, it will be advantageous to use a filter 62 in front of the prism to exclude room light from the photodiodes.

The spot 42 projected on the surface being measured is imaged on one of the reflective faces of the prism when the housing 28 is at one end of its travel. As the housing 28 moves back, the image of the spot 42 on the prism travels towards the 90° edge; crossing it to the other face as the housing 28 completes its scan. The point at which it crosses the 90° edge of the prism 52 is dependent upon where the measured surface lies in the linear range of the point 42 on the optical axis 18. This crossing point is the only instant in the cycle that the output of the photodiodes 58 and 60 are equal in amplitude.

Since the projected point or spot 42 is always on the axis 18, the measured surface must be at the intersection of the projecting spot when it is in optimum focus. This can be seen by referring to FIG. 2 of the drawings. When the projection lens 26 is at position L1 (the midpoint of its excursion) the projected light spot falls at P1. Since the surface 50 is at this point also, spot S1 indicative of point 42 is at the same position. The image of spot S1 falls at I1, or exactly on the 90° edge of the prism 52. As the projector lens 26 moves to the position L2, the point image 42 moves along the measuring axis 18 to a position P2. Since there is no surface at this point, the light passes the axis 18 and strikes the measured surface 50 at position S2, forming a slightly defocused point image. The objective lens 20 images this at point I2 on the upper side of prism 52, as indicated. In a similar manner, when the projection lens 26 moves to position L3, the point would be projected to position P3, but since the surface 50 intercepts the beam before it reaches the point, a spot is formed at S3, which is imaged on the lower side of prism 52 at I3.

Figure 2:
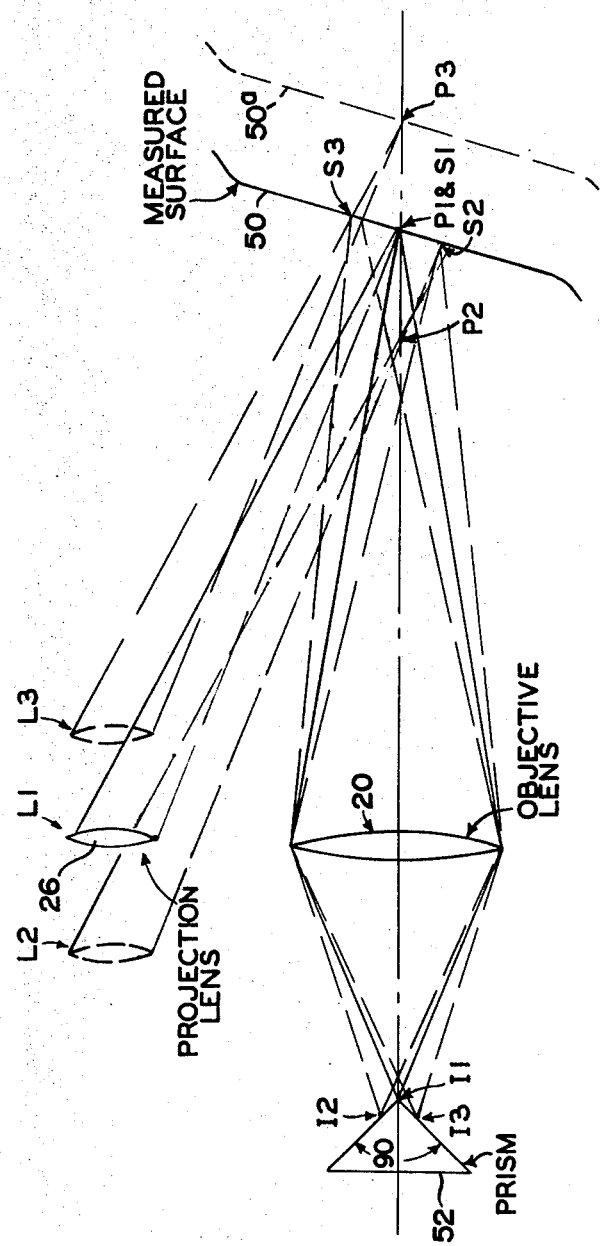
FIG. 2 is a schematic illustration of the principle of the invention showing how measurement takes place.

In the example shown in FIG. 2, the surface 50 was positioned at the center of the reading range. If it had been at a position indicated by the dashed line 50a in FIG. 2, the point 42 would be imaged exactly at position P3 on the surface 50a forming a spot that would be imaged at I1 on the edge of prism 52 by the objective lens 20. Thus, it can be seen that there is a direct linear relationship between the surface 50 and the position of the projection lens 26 when the objective lens 20 images the spot on the edge of the prism 52. If the surface to be measured were farther from the objective lens 20 than shown by the dashed position 50a in FIG. 2, the image of the spot on the surface would never cross the prism edge during the reciprocating scanning movement of the projection lens 26. In this instance, since only one of the diodes 56 or 58 would be illuminated during a complete cycle, no reading could be obtained, but information useful for moving the probe physically closer to or further from the surface 50 would still be available depending upon which diode output was actuated. Suitable mechanism to interpret a no signal output and cause movement of the entire assembly 16 to or from the surface is illustrated by block 69, and is preferably a standard servosystem well understood by those skilled in the art.

Figure 3:
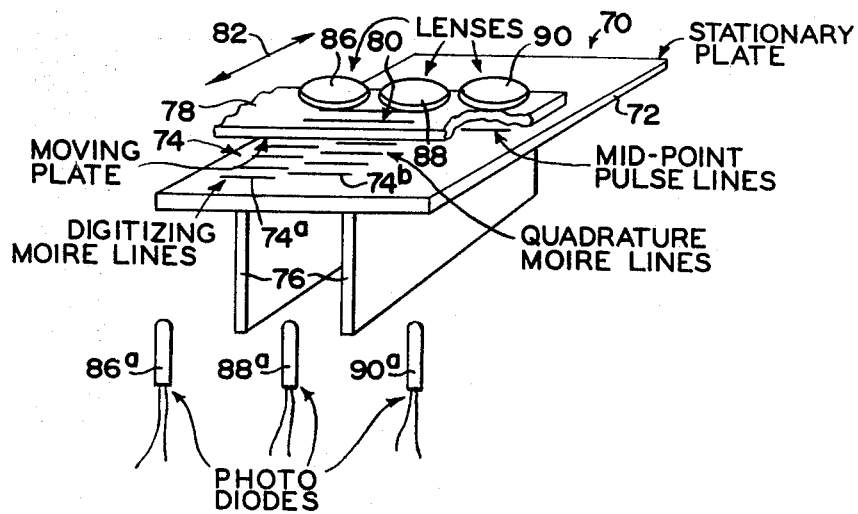
FIG. 3 is an enlarged, perspective schematic of the structure utilized to detect the position of the reciprocating lens.

Thus, it should be understood that the exact position of housing 28 with respect to housing 32 when point 42 is imaged by lens 20 exactly on the edge of prism 52 will indicate the position of surface 50 with respect to housing 28. Means necessary to determine the position of housing 28 are provided by a digitizer indicated generally by numeral 70 in FIG. 1 of the drawings, with this being shown in perspective detail in FIG. 3 of the drawings. Specifically, the digitizer comprises a grid plate 72 having a moire grid pattern of slot 74 through the surface thereof. The grid lines or slots 74 are actually divided into digitizing moire lines 74a and quadrature moire lines 74b. The plate 72 is mounted in fixed relationship to a fixed from 76. A moving plate 78 is connected directly to housing 28, and has a corresponding moire slot arrangement indicated generally by numeral 80, which has slots arranged to generally conform to the digitizing moire lines 74a and the quadrature moire lines 74b. The plate 78 moves in reciprocating relationship indicated by the double-ended arrow 82 which is substantially perpendicular to the direction of the moire lines 74 and 80, respectively, so as to create a light-dark effect as the lines in the moving plate 78 come into and out of alignment with the lines in the fixed plate 72.

In order to detect the alignment and misalignment of the lines, a lamp 84, appropriately energized and focused by respective lenses 86, 88, and 90, passes light through the respective slots to be detected by respective photodiodes 86a, 88a, and 90a. Suitable mounting for the lenses and diodes is anticipated, but is not shown to clarify the schematic perspective. The lens 90 coordinates with a single slot in moving plate 78 and a single slot in fixed plate 72 to provide a midpoint pulse indication to the system. Thus, lens 86 cooperating with the digitizing moire lines 74a provides output pulses for counting the smallest increment of movement of plate 78, which normally will be 0.001 inch. The lens 88 cooperating with moire lines 74b has a quadrature relationship to the digitizing moire lines 74a. The quadrature-related pulse trains enable a count to be obtained that reverses when the direction of the moving plate 78 changes. Naturally, pulses detected by diode 90a give an indication of the center of travel of the moving plate 78.

Figure 4:
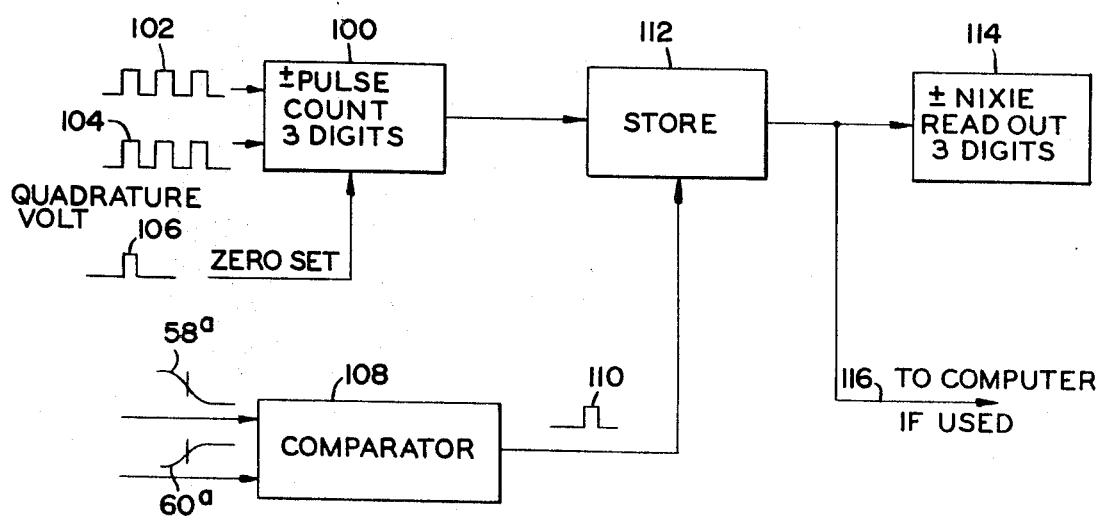
FIG. 4 is a block diagram illustration of the electronic components necessary to record the measured information.

The pulses obtained within the photodiodes 86a, 88a, and 90a, are fed to counting circuits operating as shown in the block diagram of FIG. 4. Specifically, a plus/minus counter 100 which is accurate to three digits, and which might be a component as manufactured by the Information Development Corporation, Akron Ohio, is utilized. The counter 100 counts the digitizing pulses 102 and the quadrature pulses 104 with zero being set by a zero pulse 106 obtained from the photodiode 90a indicating the center of travel of the projection lens assembly 16. Therefore, the counter 100 digitally indicates the position and direction from center with zero being set in the counter every time the housing 28 passes its center position. The voltages from photodiodes 58 and 60 are sent as signals 58a and 60a to a comparator 108 which produces a pulse indicated by numeral 110 at its output every time they are equal. The comparator might be a conventional element as used for similar purposes in the electronics field. The count from counter 100 is fed to a storage register 112 which stores the count every time a pulse 110 is received from the comparator 108. Because of the previously discussed optomechanical relationships, this count represents the distance and direction of the surface from the center of the linear reading range along axis 40, as seen in FIG. 1. The resultant signals from storage register 112 can be sent to a plus and minus nixie readout visual indicator to three digits indicated by block 114, or to a computer over line 116 as selectively desired. Naturally, the information can be stored every time a pulse is generated by comparator 108, and this in effect depends exactly upon the reciprocating relationship of housing 28. As indicated previously, the optimum reciprocating speed is between 5 cycles per second to about 20 cycles per second, with the optimum being about 10 cycles per second as generated by driver coil 38 operating through the spring 34 and mass 36.

Figure 5:
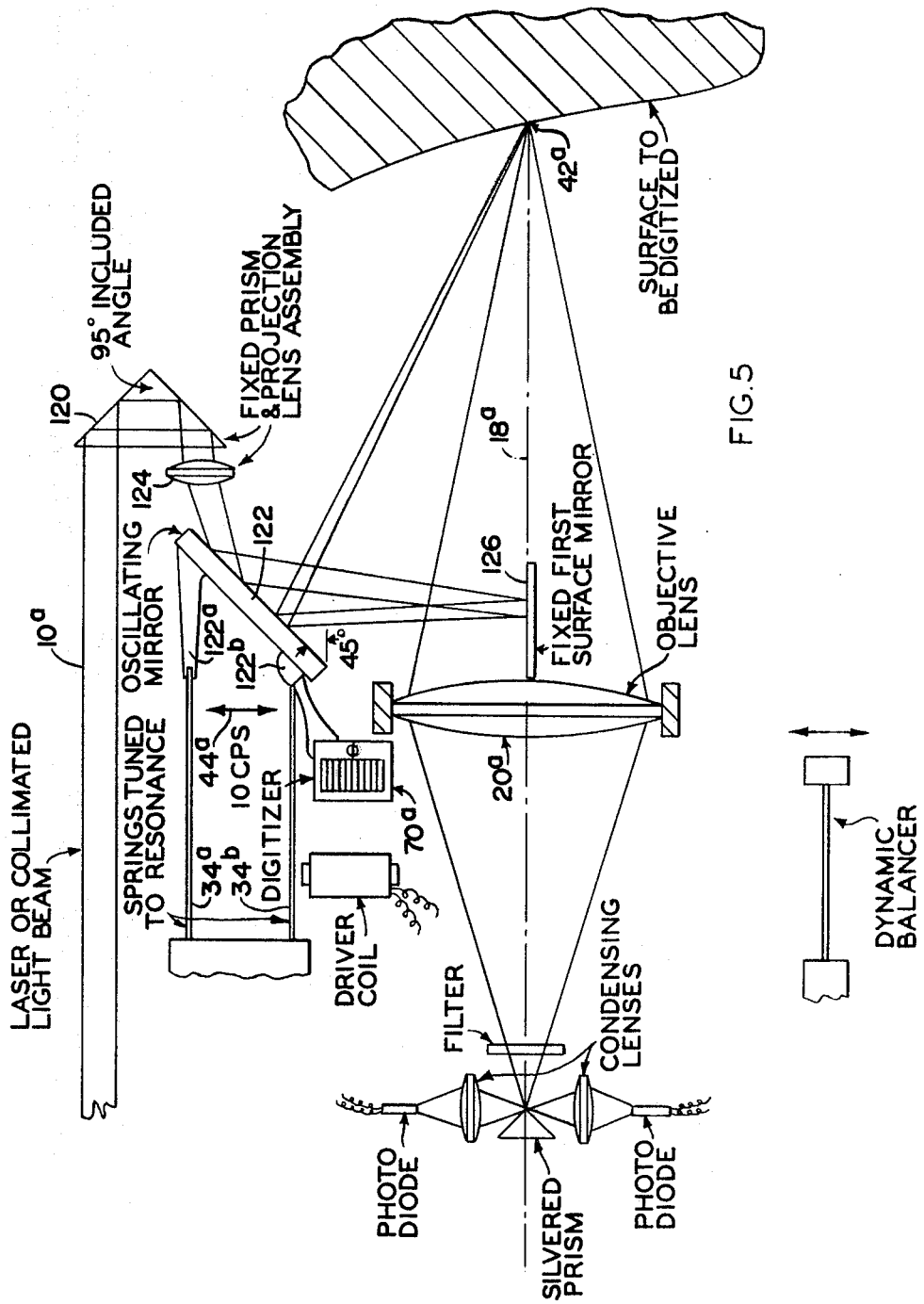
FIG. 5 is a schematic illustration of a modified embodiment of the invention showing the relationship of the components to each other.

It should be understood that the optical arrangement shown in FIG. 1 requires large mechanical excursions for the housing 28 where long reading ranges on the model surface are involved, due to the 1-to-1 correspondence between the projection lens 26 and the travel of the projected image point 42 on the measuring axis. In some instances, it is desirable to reduce this dependence on mechanical movement and under these circumstances a modified embodiment of the invention as illustrated in FIG. 5 can be utilized. The system of FIG. 5 moves the projected image point twice the distance that the mechanical element moves.

With reference to the embodiment shown in FIG. 5, it should be understood that the arrangement of the objective lens, prism, and phototube setup, as well as the digitizer, driving coil, and springs are substantially similar, and hence these are indicated by the same numeral with the suffix a. In this embodiment, the incoming beam 10a is reflected back towards the probe assembly by means of a fixed 95° included angle prism 120. It is projected onto an oscillating 45° mirror 122 by a fixed projection lens 124. The beam 10 is then directed to a fixed front surface mirror 126 positioned with its surface on the optical axis so that it does not cause any distortion or blancing of the image projected by the objective lens 20a. From the mirror 126, the beam is returned to the 45° oscillating mirror, and then forms a point image on the measuring axis 18a some distance in front of the objective lens 20a. This optical arrangement causes the projected image point 42a to scan twice the distance that the oscillating mirror 122 moves. The operation of the remainder of the system is the same as the arrangement previously described. The digitizer, indicated generally by numeral 70a, is the same as that used in the embodiment in FIG. 1, with the moving member attached to the laterally oscillating mirror 122. The lateral oscillation is in the direction indicated by the double-ended arrow 44a at a preferred oscillation of 10 cycles per second. The mirror 122 can be mounted on a spring support arrangement comprising springs 34a and 34b and supporting brackets 122a and 122b. The slightly circular path that the mirror moves does not affect the accuracy of movement of the projected spot, as long as the movement is substantially perpendicular to the axis 18a of the objective lens 20a.

If a laser beam is used as the light source, a small amount of light can be directed into an optical interferometer that is part of the moving element of either arrangement. This interferometer would replace the moire unit for the fringe source. This is especially desirable if the unit is to measure very accurate tolerances, for example, down to 0.0001-inch increments. A suitable interferometer would be one using a Michelson Dual Path principle common in optics technology.

Since both arrangements involve oscillating mechanical components, a dynamic balancer is incorporated into the probe to prevent any vibration of the structure. This unit consists of a mass-spring member tuned to the same frequency as the oscillating optical element. When it is properly oriented, it is self-excited with the phase relationship of the lens or mirror assembly. This cancels out most of the vibration present in the support.

Thus, it is seen that the objects of the invention have been achieved by providing an optical probe which utilizes a reciprocating focused point of light in conjunction with an objective lens and right angle prism to determine the exact time and point where the light is in focus on the exposed portion of the surface being measured. The accuracies available with such a technique are easily to 0.001 inch, and in many instances to as great as 0.0001 inch. The readout can be done as many times per second as is mechanically possible, thus providing an extremely fine record of the surface characteristics of a model to be measured.

While in accordance with the patent statutes only the best known embodiment of the invention has been illustrated and described in detail, it is to be particularly understood that the invention is not limited thereto or thereby, and that the inventive scope is defined in the appended claims.

What I claim is:

1. A noncontact probe to measure surface distances from a predetermined reference which comprises
    means to produce a directed beam of light energy having an axis,
    first lens means defining an optical measuring axis parallel to the axis of the directed beam of light energy,
    optical redirecting means including second lens means to angle the light beam from its axis at between about 5° to about 25° and focus the beam to a point at such angled relationship where the point falls on the axis of the first lens means,
    means to move the point in focus parallel to the axis of the directed beam of light energy and coincident with the optical axis of the first lens means so that at some time the point is in focus on the surface,
    means aligned with the optical axis of the first lens means on the opposite side thereof from the surface to detect when the point is in focus on the surface, and
    reference means to coordinate the movement of the point with the means to detect to measure the distance of the surface therefrom.

2. A probe according to claim 1 where a laser is utilized for the beam of light energy, and the beam axis parallel to the optical axis of the first lens is substantially normal to the surface.

3. A probe according to claim 1 which includes the sharp edge of a right angular silvered prism coincident with the optical axis of the first lens means of the opposite side thereof from the surface with the faces of the prism at substantially 45° relation to the plane of the first lens means.

4. A probe according to claim 3 where the means to detect is a pair of photodiodes each mounted at a similar angular spacing and distance with respect to a respective face of the prism so as to measure the light beam impinging thereon, and a comparator receiving the signals from each photodiode to determine when the signals are equal.

5. A probe according to claim 4 where the means to record the contours of the surface comprises Pi means to move the redirecting means in a direction coincident with the axis of the beam,
    a fixed slotted grid, a movable slotted grid connected to the second lens means and positioned adjacent the fixed slotted grid, and each grid having similarly spaced slots substantially aligned in their adjacent relationship whereby the movement of the second lens means causes movement of the movable slotted grid in a direction substantially normal to the direction of the slots therein, and
    radiation means directed through the grids, and means to detect the radiation passing through the grids to measure the amount and direction of movement of the movable slotted grid to the fixed slotted grid.

6. A probe according to claim 5 where each of the grids includes a single center position slot, a group of quadrature slots to determine direction of movement, and measuring slots spaced at about 0.001-inch intervals to measure the distance from the center position slot.

7. A probe according to claim 6 where the means to move the focused point is a tuned spring connected to the redirecting means, and includes other means to drive the spring at a predetermined resonant frequency.

8. A noncontact probe according to claim 1 which includes an optical system associated with the second lens means whereby physical movement of the second lens means is at least doubled in the movement of the focused point on the axis of the first lens means.

9. A noncontact probe which comprises means defining an optical measuring axis in space,
    means to generate a beam of light energy having an axis,
    means to focus and bend the beam off its axis and direct the bent portion to a focused point in space on the measuring axis,
    means to move the last-said means along an axis in space relative to a reference so that the point intersects a surface to be measured at some time during its movement, said axis being parallel to the measuring axis,
    means to detect when the point intersects a surface to be measured in focus by viewing along the measuring axis, and
    means to measure the distance of the point with respect to the reference at the instant the point is in focus on the surface to be measured.

10. A probe according to claim 9 where the beam is bent at an angle of at least 5° from its axis, and where the measuring axis is substantially perpendicular to the surface to be measured.